United States Patent [19]

McClocklin

[11] 3,788,781

[45] Jan. 29, 1974

[54] HYDRAULIC SYSTEM

[75] Inventor: Samuel B. McClocklin, Owatonna, Minn.

[73] Assignee: Owatonna Tool Company, Owatonna, Minn.

[22] Filed: Mar. 17, 1972

[21] Appl. No.: 235,573

[52] U.S. Cl............................ 417/401, 137/630.15
[51] Int. Cl...................... F04b 17/00, F04b 35/00
[58] Field of Search .......... 417/402, 401, 470, 471; 137/630.15

[56] References Cited
UNITED STATES PATENTS

| | | | |
|---|---|---|---|
| 2,781,728 | 2/1957 | Fischer et al. .................. | 417/440 X |
| 2,588,164 | 3/1952 | Roberts et al. ..................... | 417/401 |
| 2,544,972 | 3/1951 | Worthington et al...... | 137/630.15 X |
| 2,360,987 | 10/1944 | Temple...................... | 137/630.15 X |
| 2,477,237 | 7/1949 | Carr........................... | 137/630.15 X |
| 3,597,121 | 8/1971 | McClocklin ....................... | 417/400 |
| 3,103,175 | 9/1963 | Humphrey........................ | 417/401 |

*Primary Examiner*—William L. Freeh
*Assistant Examiner*—Richard Sher
*Attorney, Agent, or Firm*—Hofgren, Wegner, Allen, Stellman & McCord

[57] ABSTRACT

A manually operable high pressure release valve in a high fluid pressure system such as an air operated hydraulic pump. The release valve includes a manually operable pilot poppet valve disposed within a larger, manually operable poppet valve, the two poppet valves having a single manual actuator. Release of high pressure is allowed with a minimum of manual effort by first bleeding off a portion of the fluid under high pressure through opening of the pilot poppet valve until the pressure is reduced to a level whereat the larger poppet valve will easily open.

3 Claims, 4 Drawing Figures

HYDRAULIC SYSTEM

BACKGROUND OF THE INVENTION

This invention relates to manually operable, high pressure release valves in high pressure fluid systems such as the hydraulic circuit of an air operated hydraulic pump.

Many types of manufacturing and repair operations require the use of hydraulic jacks for a variety of purposes. Oftentimes, a source of hydraulic fluid under pressure is not readily available or is too costly to install and maintain in addition to other sources of energy which are used more frequently during such operations.

Typical of the foregoing are automobile repair garages which almost universally include an air compressor for providing a source of air under pressure. In such operations, it is also desirable to have a source of hydraulic fluid under pressure for operating jacks employed to restore damaged parts or frame members of an automobile approximately their original shape or for operating tool operating rams. As a result, there have been many proposals of air operated hydraulic pumps for converting the energy of air under relatively low pressure as, 100 psi, to energy embodied in relatively high pressure hydraulic fluid at, for example, 10,000 psi. One such pump is disclosed in the commonly assigned U.S. Pat. No. 3,597,121.

Oftentimes during the course of operations performed by fluid under pressure from such pumps, it becomes necessary to relieve the high pressure applied to a hydraulic jack and such is customarily accomplished by means of valves. Because of the high pressure employed in such systems, rotary valves are not often employed in that their very construction is generally not such that the high pressure in the system itself assists in maintaining a seal as is the case with reciprocating valves. In reciprocating valves, the application of the high pressure to the valve member itself assists in firmly seating the valve member against its seat.

On the other hand, the use of reciprocating valves in such systems presents a problem all of its own. In order to open the same to release the fluid, the valve member must be moved against the pressure and thus, considerable force must be exerted against the valve member in order to move it to a pressure relieving position. Not infrequently, the force required is on the order of several hundred pounds. Obviously, such valves are not particularly suited for systems wherein the release valve is to be operated manually.

SUMMARY OF THE INVENTION

It is a principal object of the invention to provide a new and improved reciprocal release valve for incorporation in high pressure fluid systems. More specifically, it is an object of the invention to provide a manually operable release valve in such a system, which valve does not require the application by an operator of excessive forces in order to be moved in an open, pressure releasing position.

The exemplary embodiment achieves the foregoing objects in a high pressure fluid system including a source of fluid under high pressure, an outlet in fluid communication with the source for directing fluid under high pressure to a point of use and a check valve interposed between the source and the outlet permitting unidirectional fluid flow by the addition to such a system of a high pressure fluid path from the outlet side of the check valve to a point of pressure relief and the provision of a reciprocal release valve in the fluid path to normally close the same.

The reciprocal release valve is comprised of two poppet valves, one being smaller than the other, so that one will open with less force application thereto than the other. Both the poppet valves have a common manual actuator and the arrangement is such that when the manual actuator is appropriately manipulated, the smaller one of the poppet valves will first open to bleed off the high pressure until such time as it has been relieved to the extent that the same amount of force applied to the smaller poppet will be sufficient to further move the larger poppet to an open position so that the high pressure can be completely relieved.

According to the preferred form of the invention, the large poppet includes a central fluid flow path normally closed by a spring loaded ball valve of relatively small size and disposed within the large poppet. A push rod extends from a manual operator to a position through the large poppet to a position wherein it can engage the ball to move the same to an open position and allow fluid to flow through the center of the large poppet. Once the high pressure has been partially relieved, continued exertion of the opening force will result in the shifting of the large poppet to an open position for rapid release of the remaining fluid under pressure.

According to the preferred form of the invention, the system in which the release valve is employed is that of an air operated, hydraulic pump and the manual operator is further arranged so that in one position, it will cause operation of the pump while in another, it will cause cessation of operation of the pump and the relief of hydraulic fluid under pressure.

The invention also contemplates a biasing spring operative upon a control poppet valve in the air motor driving the pump for reliability of operation even after extended use results in wear.

Other objects and advantages will become apparent from the following specification taken in conjunction with the accompanying drawings.

DESCRIPTION OF THE PREFERRED EMBODIMENT

Figure 1:
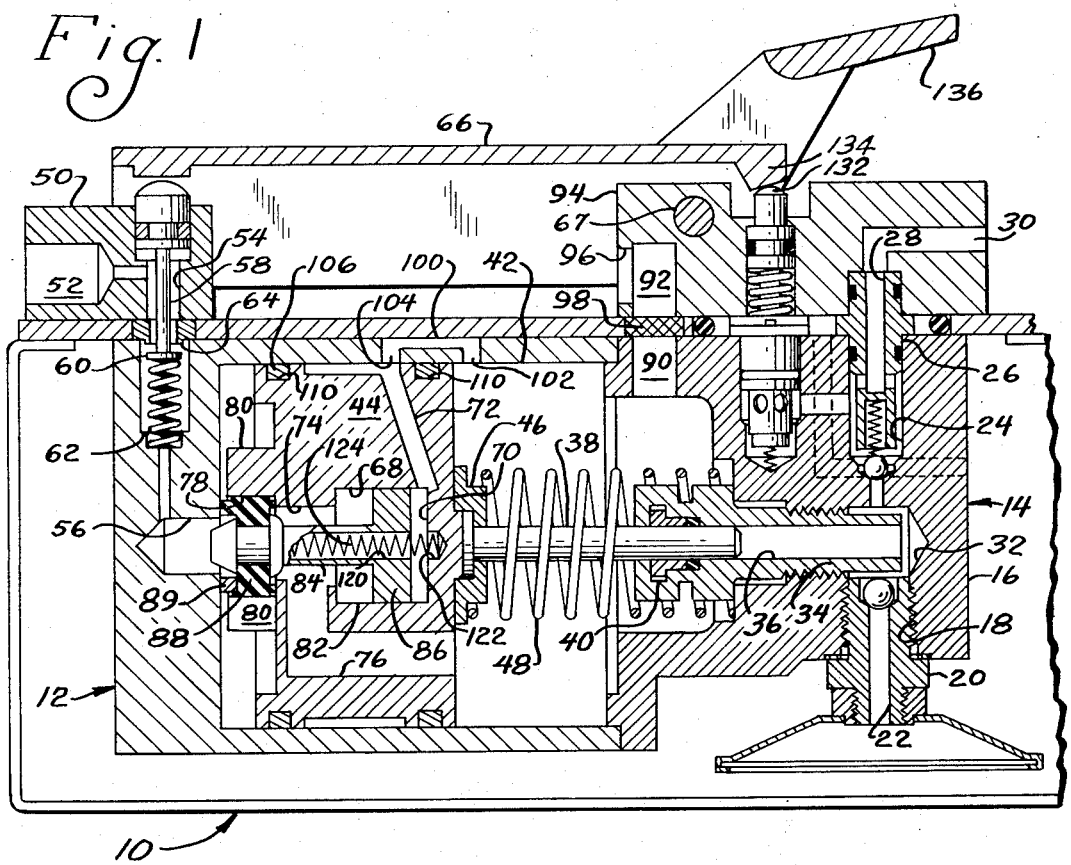
FIG. 1 is a vertical section of a fluid actuated hydraulic pump embodying the invention.

With reference to FIG. 1, an exemplary embodiment of a fluid actuated hydraulic pump made according to the invention is seen to comprise a housing and oil reservoir, generally designated 10, in which is located an air motor, generally designated 12, and a hydraulic pump, generally designated 14. Turning first to the hydraulic pump 14, the same is seen to comprise a casting 16 including a threaded bore 18 which receives a ball valve member 20 which is operative to permit hydraulic fluid to be admitted to the pump 14 during the return stroke of the motor 12 through a passage 22 adapted to be connected to any suitable source of hydraulic fluid. By the same token, the ball valve is operable to preclude the passage of hydraulic fluid during the power stroke of the motor 12 as will be seen.

The casting 16 further includes a bore 24 which receives a spring loaded check valve member 26 which has a passage 28 communicating with an outlet 30 through which hydraulic fluid under pressure may flow to a point of use.

The casting further includes a bore 32 which is in fluid communication with both the valve 20 and the valve 26 and which threadingly receives a cylinder 34 having a bore 36 in which is reciprocally received a pump piston 38. Reciprocation of the pump piston 38 within the bore 36 to the right as viewed in FIG. 1 will cause such fluid as may be located in the bore 36 and bore 32 to open the spring loaded check valve 26 and pass, under pressure, to the outlet 30. Reciprocation of the piston 38 to the left as viewed in FIG. 1 will permit ball valve 20 to open and draw hydraulic fluid into the bore 32 and the bore 36.

Suitable packing 40 may be located about bore 36 to provide a seal.

The air motor 12 includes a central bore 42 in which is received a piston 44. The piston 44 is connected to the pump piston 38 by securing means 46 so that reciprocation of the piston 44 will result in the reciprocation of the pump piston 38 and the delivery of hydraulic fluid under pressure to the outlet 30.

A coil spring 48 bears against one side of the piston 44 and against the casting 16 in such a way as to normally urge the piston 44 to the left as viewed in FIG. 1. As will be seen, the spring 48 acts to return the piston 44 to the position illustrated in FIG. 1 after each power stroke.

Mounted on the housing 10 by any suitable means is a block 50 having a fluid inlet 52 which may be connected to a source of air under pressure or the like. The inlet 52 is connected by means of a conduit 54 in the block 50 and a conduit 56 in the air motor casing to the center one end of the bore 42. Associated with the conduits 54 and 56 is a manually actuable valve member 58 including a valve element 60 which is normally urged by a spring 62 against a valve seat 64 to preclude fluid under pressure provided to the inlet 52 from travelling to the bore 42. A manual actuator 66 may be pivotally mounted to the housing 10 by a pivot pin 67 and, when pivoted in a counter-clockwise direction, is operative to move the valve element 60 away from the seat 64 and against the bias of the spring 52 so that fluid under pressure will be provided to the interior of the bore 42.

The piston 44 includes a valve chamber 68 having one end 70 communicating with the side of the piston 44 by means of a port 72. The valve chamber 68 also includes a central portion 74 of reduced diameter which is in fluid communication with the right-hand side of the piston 44 by means of a port 76. Finally, the chamber 68 includes a second end portion 78 defined by three guide prongs 80 extending from the left-hand side of the piston 44 so that, under circumstances to be seen hereinafter, fluid communication between the left-hand end of the piston 44 and the central portion 74 may be had.

Received within the chamber 68 is a control valve member in the form of a pilot operated guided poppet valve 82. The valve 82 includes a central, reduced diameter portion 84 which has a diameter less than that of the reduced diameter portion 74 of the chamber 68. The valve 82 further includes an enlarged end within the chamber end 70 and an enlarged soft poppet 88 within the end portion 78. The surface area of the enlarged end 86 is made greater than the surface area of the poppet 88 so that when equal pressures are applied to both ends of the valve 82, the same will shift to the left.

The poppet includes an annular seat 89 designed to seat against the end of the casting 12 about the point of emergence of the conduit 56.

The right-hand end of the bore 42 is normally connected to exhaust by means of a port 90 opening through the casting 16 to the end of the bore 42. The port 90 is in fluid communication with a port 92 which may be formed in a block 94 and which additionally may include a suitable mounting for the check valve 26 and the outlet 30. Through a small bore 96 in the block 94, the port 90, and thus the right-hand end of the bore 42, is vented to atmosphere. If desired, a muffler 98 may be interposed between the ports 90 and 92 to minimize noise due to exhaust fluid. However, an external muffler connected to the port 96 could be substituted therefor.

Located adjacent the bore 42 is a channel 100 which opens at spaced locations, as at 102 and 104, into the bore 42. If desired, the material separating the openings 102 and 104 can be omitted and the channel 100 formed merely as a groove in the wall of the bore 42. The conduction of fluid through the channel 100 is controlled by the position of the piston within the bore 42. The arrangement is also such that alternate ones of the ends of the channel may be in fluid communication with the port 72 associated with the right-hand end 70 of the valve chamber 68.

To preclude leakage at the interface of the piston 44 and the bore 42, the piston carries sealing means 106 and 108 in grooves 110 therein. The arrangement is such that the sealing means 106 and 108, which sealingly engage both the piston and the bore 14, flank the port 72 as it emerges from the interior of the piston 44 to the side thereof.

Thus far, the structure previously described is that disclosed in the commonly disclosed U.S. Pat. No. 3,597,121 of Aug. 3, 1971. As the mode of operation is completely described therein, in the interest of brevity, it will not be described here. In some instances, however, it may be desirable to add thereto additional structures as follows.

With reference to FIG. 1, it may be desirable to provide a bore 120 in the enlarged end of the pilot operated guided poppet valve 82 as well as through a portion of the reduced diameter portion 84 thereof. A short, deadended bore 122 may also be provided in coaxial relation with the bore 120 in the right-hand face of the valve chamber 68 and a spring 124 located within both bores 120 and 122. The spring should be such so as to urge poppet valve 82 to the left as viewed in FIG. 1 so as to provide additional insurance so that the valve 82 will remain in its leftmost position during the return stroke of the hydraulic piston 38.

Those skilled in the art will recognize that normally such action is provided by a trapped column of fluid established shortly after the piston 34 begins to move from its rightmost position towards the left and after the valve 82 is shifted to the left. The trapped column of fluid is effective against the right-hand face of the enlarged end 86 of the valve 82 as described in the above-mentioned U.S. Pat. No. 3,597,121. However, after extended use, a leakage path about the enlarged end 86 of across the seal 108 may come into existence simply due to wear. Should such a leakage path develop, the trapped column of fluid will no longer be completely trapped to hold the poppet valve 82 to a fully open position during leftward travel of the piston 44. The spring 124 tends to supplement the holding action of a partially trapped body of fluid in such an instance.

As generally alluded to previously, occasions arise during operation of the pump when it is desirable to release the pressure in the high pressure side of the hydraulic circuit in which the pump is used. Far more often than not, the built up pressures on the high pressure side are so great that it is virtually physically impossible to manually operate and open a reciprocal valve against such pressures. Thus, the instant invention employs a manually operated pilot for a poppet valve, generally designated 130, which includes an operator 132 adapted to be engaged by tongue 134 when the manual actuator 66 is pivoted in a clockwise direction about pivot 67 as, for example, by the application of manual force to an upwardly projecting handle 136.

Figure 2:
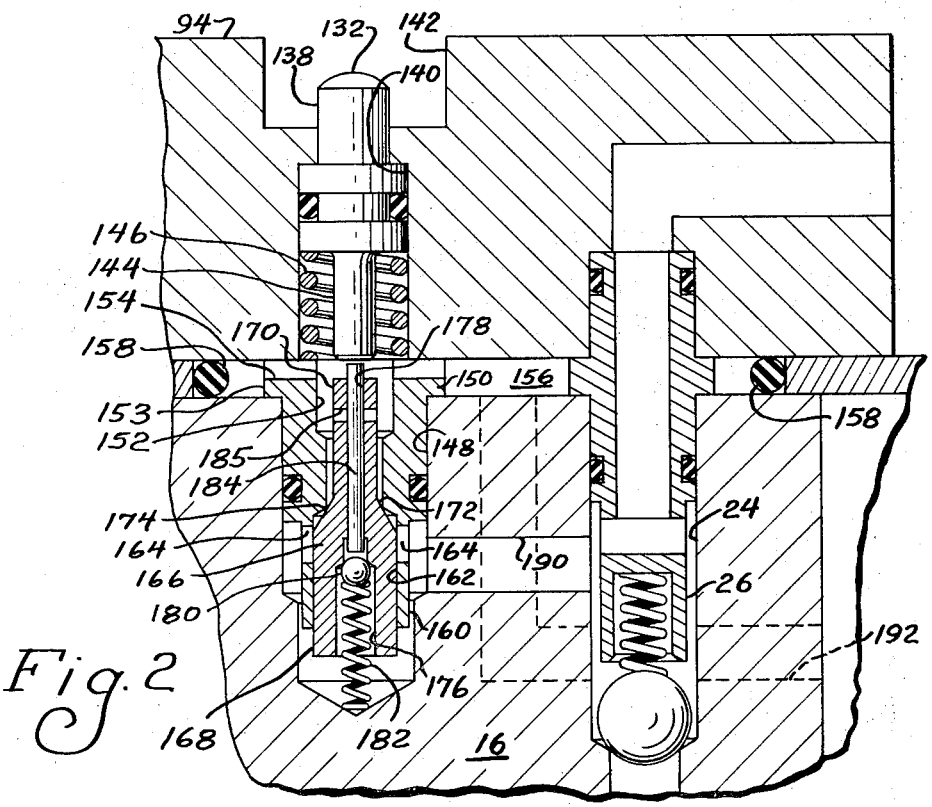
FIG. 2 is a fragmentary vertical section of a manually operable high pressure release valve employed in the pump and shown in a closed position.
Figure 3:
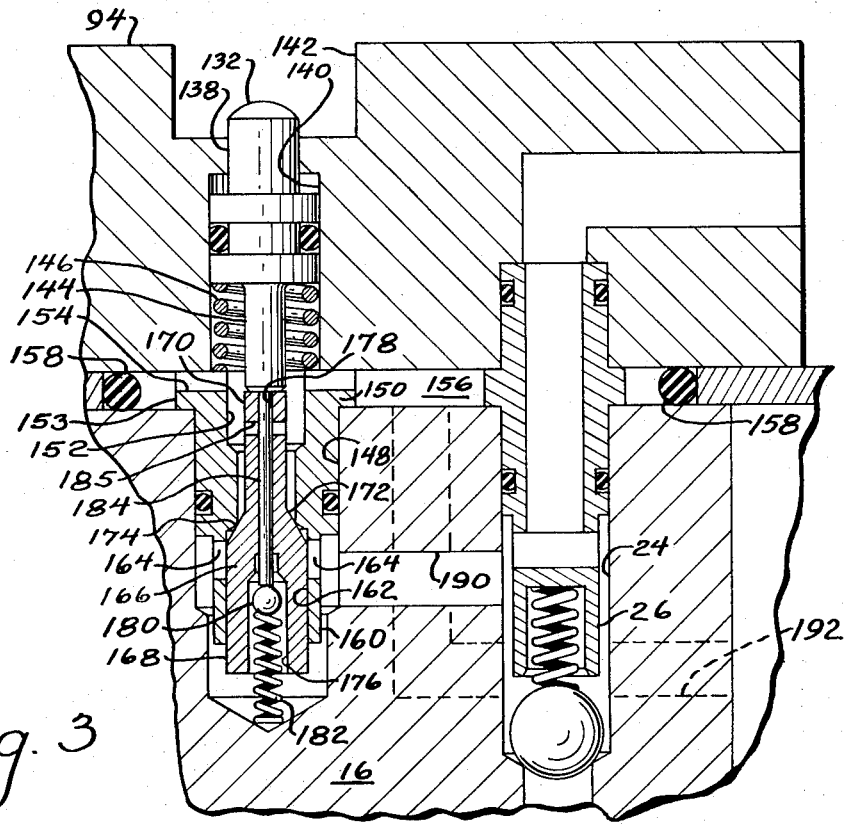
FIG. 3 is a fragmentary vertical section of the pump illustrating the release valve with a pilot member therein operated.
Figure 4:
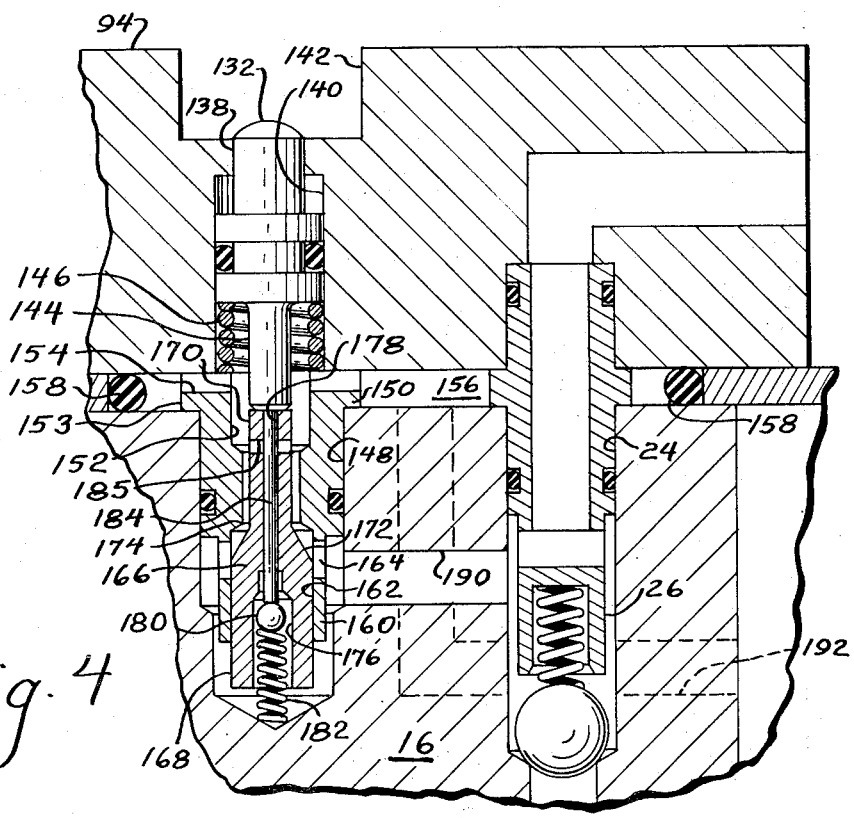
FIG. 4 is a fragmentary vertical section of the release valve in a wholly open state.

With reference now to FIGS. 2-4, inclusive, which show the valve 130 with greater clarity than FIG. 1, the same would be described. The manual operator 132 is seen to be comprised of the reduced diameter end of a plunger structure 138 received in the upper end of a stepped bore 140 in the block 94 and extends into a recess 142 in the upper surface of the latter. The plunger structure 138 is completed by a downward extension 144 within the bore 140 and a spring 146 is located in the lower end of the bore 140 about the extension 144 to normally urge the plunger structure 138 to the position shown in FIG. 2.

A bore 148 is located in the casting 16 so as to be concentric with the bore 140 and receives, at its upper end, a valve seat member 150 having a hollow center 152. The valve seat member 150 includes a peripheral flange 153 at its upper end and the upper surface of the latter includes ports 154 extending into a fluid conduit 156 defined by a space between the block 94 and the casting 16 and closed up by sealing means 158.

The valve seat member 150 further includes a depending cylindrical guide 160 including a central bore 162 which is essentially an enlarged continuation of the hollow center 152 of the remainder of the seat. The guide 160 has a lesser outer diameter than the large diameter of the bore 148. Near the upper end of the bore 162 there is located radially extending ports 164.

A large poppet valve member 166 includes an enlarged end 168 slidably received within the bore 162, an upper end 170 normally spaced from the lowermost point of the extension 144 of the plunger structure 138 when the latter is in its uppermost position, and a frusto-conical sealing surface 172 which is adapted to sealingly engage a stepped seat formation 174 on the valve seat member 150.

The enlarged lower end 168 of the poppet valve 166 includes a central upwardly extending bore 176 of relatively large diameter which terminates in a bore 178 of lesser diameter, which in turn extends all the way to the upper extremity of the valve member 166. Within the large diameter bore 176 is a ball 180 normally urged upwardly by a spring 182 interposed between the lower surface of the same and the end of the bore 148.

Loosely received within the small bore 178 is a rod 184 which serves as a manually operable pilot for the small poppet valve defined by the ball 180 and the upper most end of the large bore 176.

A fluid passage 190 is provided in the casting 16 by any suitable method and extends from the bore 14 at a point on the high pressure side of the check valve 26 to the bore 148 adjacent the downward extension 160 of the valve seat 150. Finally, in another plane, a fluid passage 192 is established from the space 156 to the exterior of the casting 16, and thus to the interior of the oil reservoir defined by the housing 10.

The operation of the release valve system will now be described. As will be apparent from the foregoing description, a possible relief path from the high pressure side to the reservoir exists via the passage 190, the various structure of the valve 130, the space 156, and the conduit 192. However, it will also be recognized from the consideration of the elements and their position illustrated in FIG. 2, that when the elements are in such a position, the relief path will not be established, and that full pressure will be applied to the underside of the poppet valve 166. If it is desired to relieve the pressure on the high pressure side, the manual actuator 66 is provided in a clockwise direction. Such action will immediately result in a closing of the valve 58 halting further operation of the pump. In addition, the tongue 134 (FIG. 1) will urge the plunger structure 138 downwardly which in turn will move the rod 184 downwardly to move the ball 180 away from the end of the small bore 178. Because of the loose fit of the rod 184 within the small bore, fluid from the high pressure side will be allowed to flow along the rod 184 within the bore 178 until it reaches the radially extending ports 185 in the upper end 170 of the poppet valve 166 from which it may flow through the above path to the reservoir. This action will continue until the high pressure has been at least partially relieved.

At some point in the process, the same amount of force applied to the manual operator 66 will equal the force remaining on the high pressure side so that the continued application of the force will result in the plunger structure 138 moving further downwardly to the position illustrated in FIG. 4. At this time, not only will the small poppet valve defined by the ball 180 be opened, but the large poppet valve 166 as well. Specifically, the frusto-conical surface 172 will be moved away from the seat formation 174 in the valve seat 150 thereby fully opening the valve to relieve the high pressure at an even faster rate and allow free flow of fluid from the system to the reservoir until the fluid from the system is exhausted and/or the manual actuator 66 released.

Thus, manual pressure release may be easily attained according to the invention. As an example of the advantages produced by the same, if the system pressure is on the order of 10,000 psi, for typical dimensions of a pump made according to the invention, a force of 48 lbs. on the actuating rod 184 is sufficient to move the ball 180 away from its seat to initiate pressure relief. When the total system pressure drops to 1,400 psi, with the same application of force, the poppet valve 166 will open. On the other hand, to open the poppet valve 166 directly at a system pressure of 10,000 psi, a force of 330 lbs. to the actuating rod 184 would be required. Thus, the invention reduces manual effort required to establish relief by some 85 percent.

I claim:

1. In a high pressure fluid system including an air driven hydraulic pump defining a source of hydraulic fluid under high pressure, an outlet in fluid communication with the source for directing fluid under high pressure to a point of use and check valve means interposed between the source and the outlet for permitting fluid to flow only from the source toward the outlet, the improvement comprising: means defining a high pressure fluid path from the outlet side of said check valve means to a point of pressure relief and reciprocal valve means in said path and normally closing the same, said reciprocal valve means including first and second valve members, said first valve member being movable against the high pressure to an open position with a significantly lesser force than said second valve member, a common manual actuator for said first and second valves whereby manipulation of said manual operator will cause said first valve member to move to an open position with a minimum amount of manually exerted force to initiate relief of the high pressure in the path until the pressure valve has been lowered sufficiently so that said second valve member may move to an open position with the application of substantially the same amount of manually exerted force on said manual actuator; and an air valve operable to establish fluid communication between a source of air under pressure and said pump, said manual actuator being movably mounted on said pump so as to open said air valve when moved in one way and to close said air valve and relieve hydraulic pressure when moved in another way.

2. The air driven hydraulic pump of claim 1 wherein said first valve member comprises a small poppet valve and said second valve member comprises a poppet valve larger than said small poppet valve.

3. In a high pressure fluid system including an air driven hydraulic pump defining a source of hydraulic fluid under pressure, an outlet in fluid communication with the source for directing fluid under high pressure to a point of use and check valve means interposed between the source and the outlet for permitting fluid to flow only from the source toward the outlet, the improvement comprising: means defining a high pressure fluid path from the outlet side of said check valve means to a point of pressure relief and reciprocal valve means in said path and normally closing the same, said reciprocal valve means including first and second valve members, said first valve member being movable against the high pressure to an open position with a significantly lesser force than said second valve member, and a common manual actuator for said first and second valves whereby manipulation of said manual operator will cause said first valve member to move to an open position with a minimum amount of manually exerted force to initiate relief of the high pressure in the path until the pressure value has been lowered sufficiently so that said second valve member may move to an open position with the application of substantially the same amount of manually exerted force on said manual actuator; said second valve member comprising an elongated, generally tubular structure received for reciprocation within a bore including a seat, the interior of said tubular member defining a seat for said second valve member, one end of said tubular member being adapted to be engaged by said manual operator to move said tubular member away from said seat in said bore; said first valve member being located within said tubular member and adapted to sealingly engage the seat within the interior thereof, and a push rod located within the interior thereof, and a push rod located within the interior of said tubular member and extending beyond said end thereof to be engaged by said manual actuator, said push rod further being in engagement with said first valve member so that when engaged and moved by said manual operator the same will operate to move said first valve member away from the seat in the interior of said tubular member; said push rod being loosely received within the interior of said tubular member, said tubular member including radially extending ports from the interior thereof to the exterior thereof, said ports being located between said seat in the interior thereof and said end of the tubular member; a spring normally biasing said first valve member into engagement with said seat in the interior of said tubular member; said bore including cylindrical guide means for said tubular member, and port means in said tubular guide in fluid communication with said path and the interior of said bore; said air driven hydraulic pump including a reciprocal air motor for driving a reciprocal hydraulic pump, and air valve means operable to admit air to said air motor to drive said reciprocal hydraulic pump, said manual actuator comprising a handle pivotally secured to said air driven hydraulic pump and manually movable between a first position wherein said air valve means is open to allow the admittance of air to said air motor, and said reciprocal valve means is closed, a second position wherein said reciprocal valve means is open to relieve system pressure and said air valve means is closed to cease operation of said air driven hydraulic pump, and a third position wherein both said air valve means and said reciprocal valve means are closed.

* * * * *